March 2, 1937.  C. W. OBERT  2,072,273
PRESSURE VESSEL SHELL AND METHOD OF FORMING THE SAME
Filed April 26, 1933
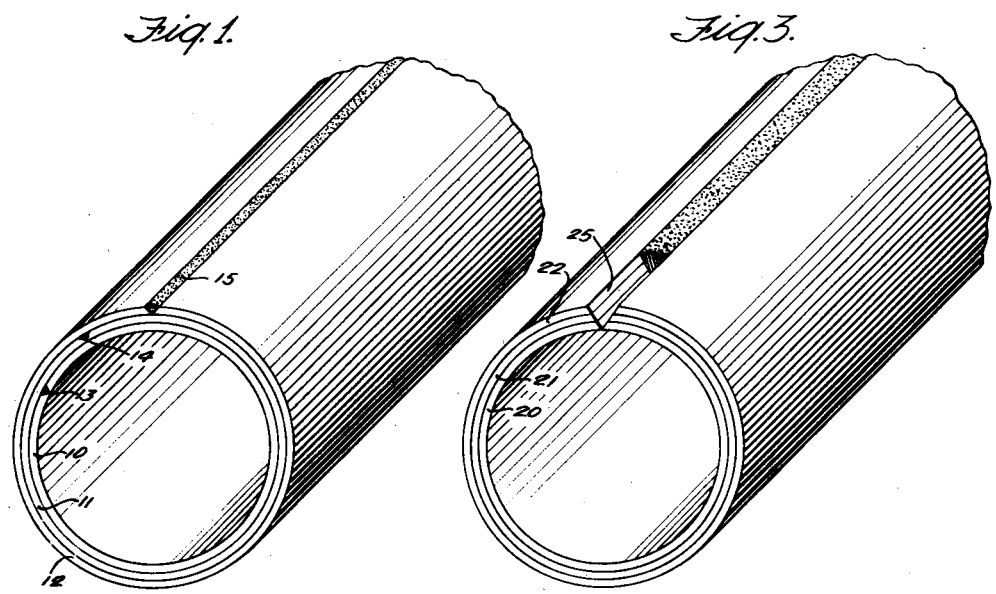
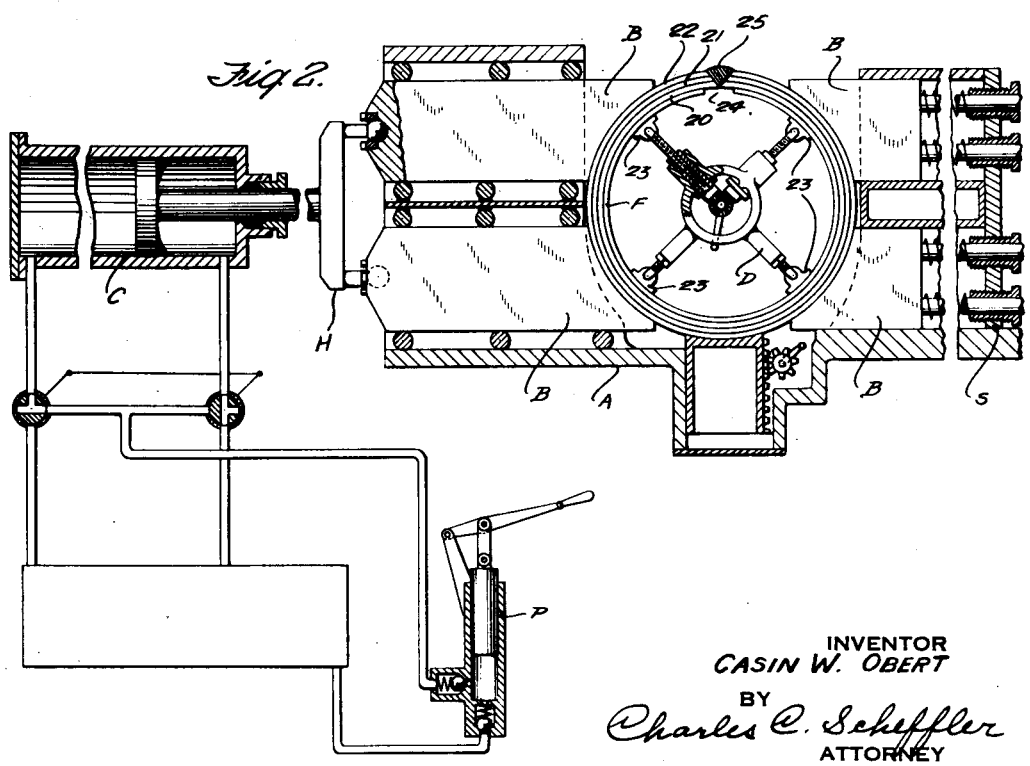
INVENTOR
*CASIN W. OBERT*
BY
*Charles C. Scheffler*
ATTORNEY Patented Mar. 2, 1937

2,072,273

UNITED STATES PATENT OFFICE 2,072,273

PRESSURE VESSEL SHELL AND METHOD OF FORMING THE SAME

Casin W. Obert, Mount Vernon, N. Y., assignor, by mesne assignments, to Union Carbide and Carbon Corporation, a corporation of New York Application April 26, 1933, Serial No. 667,982

19 Claims. (Cl. 29—148.2)

My invention relates to pressure vessels and has particular reference to the construction of multi-walled shells for use in high pressure vessels and the method of making multi-walled shells.

Multi-walled shells for high pressure vessels have been developed to provide greater strength per unit weight and to facilitate the manufacture of high pressure vessels as compared to the solid, single-walled shells used in high pressure vessels heretofore. I am aware that shells for multi-walled pressure vessels have been made of both riveted and welded construction. In the riveted construction the superimposed layers or plates of metal have been shaped in the form of a cylinder and their longitudinal contiguous edges have been riveted together. It is recognized that riveted joints can be made substantially equal to the strength of the plates only by the use of several rows of rivets which require that the borders of the metal to be joined overlap a considerable extent or that extra wide butt straps be used. The overlapping plate and the rivets add materially to the weight of the structure. Also since the rivet heads and the laps formed by riveted joints cause a partial separation of the superimposed layers of metal which form the shell, each layer does not reinforce the other over these separated areas, and weak spots occur in the structure over such areas.

In the welded multi-walled shells the contiguous borders of the cylindrically formed plates may be united by butt welds without lapping the borders of the plates. However spaces may be formed between the walls in this type of structure unless the necessary precautions are taken to obtain close contact between the entire contiguous surfaces of the walls of the shell. Heretofore the several walls of the shell have been formed and the contiguous edges of each butt welded separately before the walls were superimposed upon each other, and after being welded the several walls were telescoped one into or over the other in such a manner that the welded joint of each wall was diametrically opposed to the other. As it is impracticable to obtain a good fit between the opposed surfaces of adjacent walls by rolling or otherwise press-forming the walls one without the other, an extra step, such as accurately machining the opposed surfaces or tightly shrinking one surface upon the other, is required to obtain the desired fit. In the first case the walls are made weaker and the labor cost is increased by the machining process, and in the latter case detrimental shrinkage stress may be set up therein.

One of the objects of my invention is therefore to improve the structure of multi-walled vessels and the process of making the same in which closer contact between the contiguous surfaces of the superimposed walls is obtained and with greater facility than has been obtained heretofore.

A further object of my invention is to build up a pressure vessel shell of several sheets of metal bent to shape and closely superimposed one on the other.

Other objects together with the novel features of this invention will be apparent from the following description and the accompanying drawing, of which Fig. 1 is a view showing a pressure vessel shell embodying the present invention.

Fig. 2 is a view disclosing a multi-walled pressure vessel shell held within a die or press for welding along a single seam; and Fig. 3 is a view of the shell removed from the press.

In accordance with my invention the inner sheet or wall of the shell may be shaped into the desired tubular form by rolling and/or pressing over a mandrel in such a manner that a longitudinal seam is formed between two opposed edges of the sheet. The longitudinal contiguous edges of the sheets are then butt welded together. Each succeeding outer wall may then be formed over the next preceding inner wall so that the contours of the contiguous surfaces conform to each other in shape and make close contact with each other. The longitudinal edges of the successive sheets are successively welded together while the walls are clamped together. The pressure applied by the clamp and the contraction of the weld may be so regulated as to obtain the desired normal pressure or a uniformly close contact between the walls.

A variation in the preceding method may be employed in which two or more superimposed sheets or plates of metal are rolled into a tubular form and/or pressed over a mandrel so that the walls of each sheet are pressed together and a longitudinal seam is formed on a common radius between edges of each of the sheets. A common seam is then welded together with a unitary butt weld while the surfaces of the sheets are clamped together. The tightness of the fit may be controlled by the pressure applied to the sheets and the contraction of the weld as in the previous case.

As shown in Fig. 1 the improved shell comprises a plurality of relatively thin sheets of metal which are rolled to shape and superimposed one on the other and welded. The seams of the various sheets may be positioned at different points of the periphery of the shell and successively welded while the sheets are clamped tightly together.

Sheets of metal 10, 11, and 12 may be bent to shape in forming rolls in accord with the common method of cold rolling of plate, the axis of the intermediate roll being shifted after each successive passage of the sheet so as to impart a smaller radius of curvature to the metal. When the sheet 10 is bent to shape it may be taken out of the rolls and clamped to maintain its cylindrical form until the edges are welded together along the longitudinal seam 13. In order to produce a uniformly close contact over the entire area of the lower sheet with the next enveloping sheet, the weld along the seam 13 as well as succeeding welds are desirably finished flush with the surface of the sheet, any raised reinforcement being ground or machined off. The sheet 11 is next rolled to shape and slipped over the sheet 10 and the two sheets are clamped tightly together with the seam 14 of the outer shell 11 offset from the position of the seam 13 in the sheet 10. While the sheets of metal are thus held together the edges of the sheet 11 are welded along the seam 14. The sheet 12 is similarly formed, clamped on the exterior of the sheet 11 and welded together along a seam 15. Other sheets may be added to build up a shell of any desired thickness. In making welds at each of the longitudinal seams of the various layers, the preceding sheet acts as a liner to prevent the running through of weld metal.

By constructing a pressure vessel shell in the manner just described, a wall of any desired thickness may be built up. The relatively thin layers of the laminated shell will have a certain degree of flexibility for adjustments to concentrations or variations of stress that is not attainable in single plate shells. The distribution of the stresses imposed on the shell between the different layers of metal adds materially to the ultimate strength of the vessel, since the weakness of any one sheet of metal, which is due to a flaw in construction, will not seriously affect the safety of the finished shell.

An alternative method of shaping and welding a laminated shell is illustrated in Fig. 2. The sheets of metal 20, 21, and 22 may be partially shaped in forming rolls and then passed around a form F. The form F comprises a cylindrical barrel reinforced with longitudinal braces or straps of metal 23 to which the barrel is welded or riveted. A space 24 is provided in the wall of the form F so that the edges or seams of the sheets 20, 21, and 22 will not be supported by the form. The blocks B of a forming die or press are compressed against the outer wall of sheet 22 in order to force all of the sheets tightly together around the form F. There is thus maintained a substantially uniform pressure both externally and internally of the sheets during the welding operation.

It is preferred to preshape the longitudinal edges of the plates to insure a single weld V or groove 25, extending from the outer sheet to the inner sheet when the sheets of metal have been substantially aligned. The weld V 25 is positioned above the opening 24 in the form F in order that the sheets may be welded without any danger of molten weld metal adhering to the form. The blocks B may be mounted on a movable head H and stationary base S, respectively, of a press A. Any convenient means may be employed to operate the press A, such as an hydraulic cylinder C and pump P, which together may be controlled to bring pressure against the metal held on the form F. When the weld is completed the pressure is reduced and the form F is removed, preferably by a rim-shrinking device D of the usual form.

Other methods may be employed to roll and form the sheets of metal and other methods may be used in clamping the sheets together. Barrel hoops with tightening lugs are convenient means for bringing a number of curved cylindrical plates into close association with one another around a form. Any number of sheets may be used in building up the walls of the vessel to the desired thickness, each sheet being preferably of moderate gauge between ¼ and ⅜ inches in order to permit uniform flexing and ease of bending.

The laminated shell, particularly as shown in Fig. 2, may be joined along the single seam by methods other than welding. As an example the sheets may be lapped and riveted or joined by crimping means.

Although only two forms of this invention have been illustrated and described, it will be understood that other changes may be made without departing from the scope of the invention.

I claim:—

1. The method of making a pressure vessel shell which comprises forming a plurality of metal sheets; superimposing one sheet upon the other; applying substantially uniform pressure both externally and internally of the superimposed sheets to hold them tightly together; and joining the sheets together along their respective seams while such pressure is maintained.

2. The method of making a pressure vessel shell which comprises forming a plurality of metal sheets; superimposing and tightly clamping one sheet upon the other; and joining the sheets together along their respective seams while each sheet is tightly clamped.

3. The method of making a vessel shell which comprises cylindrically forming a sheet of metal; welding said sheet along the longitudinal edges thereof; and superimposing and clamping other sheets of metal upon the first and one on the other and welding each sheet while clamped against the preceding one.

4. The method of making a pressure vessel shell which comprises forming a plate to a shape; joining said plate together along the longitudinal seam by high-temperature fusion; superimposing and clamping a second plate on the first; joining the second plate together along the longitudinal edges by high-temperature fusion; and similarly adding more plates until the desired shell thickness has been obtained.

5. The method of making a pressure vessel shell which comprises forming a plate of cylindrical shape; welding said plate along the longitudinal edges thereof; superimposing a second plate on the first; clamping the second plate to contact uniformly with the outer surface of the first plate; welding the second plate together along the longitudinal edges thereof; and similarly superimposing, clamping and welding additional plates until the desired wall thickness of the shell has been obtained.

6. The method of making a pressure vessel shell which comprises the steps of preshaping and forming a plate so as to produce a longitudinal seam, welding said plate along said seam, preshaping and forming a second plate so as to produce a plate conforming to the shape of said first plate and having a longitudinal seam adapted to be V-welded, superimposing said second plate upon said first plate, clamping said second plate upon said first plate and uniting said second plate by a V-weld along the longitudinal seam thereof while in the clamped position, and similarly preshaping, forming, superimposing, clamping and uniting plates until the desired wall thickness of the shell has been obtained.

7. The method of making a vessel shell which comprises the steps of forming a sheet of metal upon a die, clamping said sheet upon the die, welding said sheet along the longitudinal edges thereof while so clamped, placing a second sheet upon the first and forming said second sheet upon said first sheet while supported by said die, clamping said second sheet upon said first sheet, welding said second sheet along the longitudinal edges thereof while so clamped, and simultaneously placing, forming, clamping and welding successive sheets until the desired thickness of the shell has been obtained.

8. The method of making a pressure vessel shell which comprises forming a plurality of superimposed metal sheets into a tubular shape so that each sheet has a longitudinal seam between contiguous edges thereof; forming a welding V along the seam of each sheet; and welding the sheets together along their respective seams, said seams being positioned at various points about the circumference of said shell, and the V welds being adapted to unite each sheet without uniting adjacent sheets.

9. The method of making a vessel shell which comprises cylindrically preforming a plurality of superimposed plates; clamping the plates together; and welding the edges of the plates along a single seam.

10. The method of making a cylindrical vessel shell which comprises forming a plurality of substantially cylindrical metal sheets; successively superimposing one sheet upon the other; clamping said sheets in their superimposed condition; and joining the sheets together along a single longitudinal seam.

11. The method of making a cylindrical vessel shell which comprises separately forming a plurality of plates; superimposing one plate on the other; clamping all of the plates uniformly together by both internal and external pressure; and joining said plates along a single seam.

12. The method of making a pressure vessel shell which comprises the steps of preforming a plurality of plates; superimposing said plates one upon the other so as to provide a single longitudinal seam; clamping said plates in their superimposed condition; and welding said plates along said seam while said plates are clamped.

13. A shell for high pressure vessels comprising a plurality of superimposed metal plates in uniformly close contact throughout their juxtaposed surfaces and uniformly shaped together, and joined along the longitudinal seams thereof.

14. A pressure vessel shell comprising a plurality of superimposed and conforming sheets of metal in a uniformly close surface contacting juxtaposition, each sheet being separately welded along a single longitudinal seam.

15. A pressure vessel shell comprising a cylindrical sheet of metal fused together by a V weld along a longitudinal seam; a second sheet of metal superimposed on the first and similarly joined together at a point on the circumference of the shell removed from the seam of the first sheet; and a plurality of similar sheets of metal being superimposed one on the other and having seams at various points of the circumference of the shell.

16. A pressure vessel shell comprising a plurality of conforming sheets of metal united in a uniformly close surface contacting juxtaposition by a single longitudinal weld.

17. A pressure vessel shell comprising a plurality of cylindrical superimposed sheets of metal, being closely associated in uniformly close contact throughout their juxtaposed surfaces one with the other and joined together along a single longitudinal seam.

18. A pressure vessel shell comprising a plurality of superimposed cylindrical sheets of metal, being closely held in uniformly close contact throughout their juxtaposed surfaces one against the other and all of the sheets of metal being welded together along a single longitudinal seam.

19. A pressure vessel shell comprising a cylindrical sheet of metal; a second sheet of metal closely superimposed on the first, said sheets being in uniformly close contact throughout their juxtaposed surfaces; a plurality of sheets similarly superimposed one on the other; and a single welded seam joining all the sheets together along a longitudinal line in the circumference of the shell.

CASIN W. OBERT.

DISCLAIMER 2,072,273.—*Casin W. Obert*, Mount Vernon, N. Y. PRESSURE VESSEL SHELL AND METHOD OF FORMING THE SAME. Patent dated March 2, 1937. Disclaimer filed September 19, 1942, by the assignee. *The Linde Air Products Company*.

Hereby disclaims claims 14, 16, 17, 18, and 19 of said patent.

[*Official Gazette October 20, 1942.*]